(12) United States Patent  
Moroz

(10) Patent No.: US 7,095,129 B2  
(45) Date of Patent: Aug. 22, 2006

(54) METHODS AND APPARATUS FOR ROTOR LOAD CONTROL IN WIND TURBINES

(75) Inventor: Emilian Mieczyslaw Moroz, San Diego, CA (US)

(73) Assignee: General Electric Company, Schenectady, NY (US)

( * ) Notice: Subject to any disclaimer, the term of this patent is extended or adjusted under 35 U.S.C. 154(b) by 145 days.

(21) Appl. No.: 10/880,715

(22) Filed: Jun. 30, 2004

(65) Prior Publication Data

US 2006/0001268 A1    Jan. 5, 2006

(51) Int. Cl.
   *F03D 13/00*    (2006.01)
(52) U.S. Cl. .......................................... 290/44; 290/55
(58) Field of Classification Search ................ 290/44, 290/55
   See application file for complete search history.

(56) References Cited

U.S. PATENT DOCUMENTS

| 1,362,753 | A | * | 12/1920 | Sperry | ......................... | 290/44 |
| 2,058,500 | A | * | 10/1936 | Plucker | ....................... | 290/55 |
| 2,145,511 | A | * | 1/1939 | Grohmann | ................... | 290/44 |
| 2,403,564 | A | * | 7/1946 | Stein | ............................ | 290/44 |
| 4,204,126 | A | * | 5/1980 | Diggs | ........................... | 290/55 |
| 4,435,646 | A | * | 3/1984 | Coleman et al. | .............. | 290/44 |
| 4,585,950 | A | * | 4/1986 | Lund | ............................ | 290/44 |
| 4,613,760 | A | * | 9/1986 | Law | ............................ | 290/1 C |
| 4,636,707 | A | * | 1/1987 | Law | ............................ | 322/35 |
| 4,915,590 | A |   | 4/1990 | Eckland et al. | | |
| 5,083,039 | A | * | 1/1992 | Richardson et al. | .......... | 290/44 |
| 5,669,758 | A |   | 9/1997 | Williamson | | |
| 6,503,058 | B1 |   | 1/2003 | Selig et al. | | |
| 6,514,043 | B1 |   | 2/2003 | Rasmussen et al. | | |
| 6,705,838 | B1 |   | 3/2004 | Bak et al. | | |
| 2002/0000723 | A1 |   | 1/2002 | Weitkamp | | |
| 2002/0067274 | A1 |   | 6/2002 | Haller | | |
| 2002/0070558 | A1 | * | 6/2002 | Johann | ......................... | 290/44 |
| 2003/0127862 | A1 |   | 7/2003 | Weitkamp | | |
| 2003/0230898 | A1 |   | 12/2003 | Jamieson et al. | | |
| 2005/0012339 | A1 | * | 1/2005 | Mikhail et al. | ................ | 290/44 |

FOREIGN PATENT DOCUMENTS

| EP | 1363019 | A2 | * | 11/2003 |
| GB | 2036881 | A | * | 7/1980 |
| GB | 2206930 | A | * | 1/1989 |
| JP | 2003336571 | A | * | 11/2003 |
| WO | WO 01/33075 | A1 | | 5/2001 |
| WO | WO 3016712 | A1 | * | 2/2003 |

OTHER PUBLICATIONS

T. Rovio, H. Viriala, L. Soderlund, J. Kriikka; "Axial and Radial Flux Generators in Small-Scale Wind Power Production"; *Institute of Electromagnetics*, Tampere University of Technology, Finland, Date Unknown.

* cited by examiner

*Primary Examiner*—Joseph Waks
(74) *Attorney, Agent, or Firm*—James E. McGinness; Armstrong Teasdale LLP

(57) ABSTRACT

A wind turbine having a rotor, at least one rotor blade, and a plurality of generators, of which a first generator is configured to provide power to an electric grid and a second generator is configured to provide power to the wind turbine during times of grid loss. The wind turbine is configured to utilize power provided by the second generator to reduce loads on the wind turbine during times of grid loss.

26 Claims, 4 Drawing Sheets

METHODS AND APPARATUS FOR ROTOR LOAD CONTROL IN WIND TURBINES

STATEMENT REGARDING FEDERALLY SPONSORED RESEARCH & DEVELOPMENT

The U.S. Government has certain rights in this invention as provided for by the terms of Contract No. DE-AC36-83CH10093, Subcontract No. ZAM-7-13320-26 awarded by the Department of Energy/Midwest Research Institute, National Renewable Energy Laboratory Division.

BACKGROUND OF THE INVENTION

This invention relates generally to wind turbines, and more particularly to methods and apparatus for efficiently reducing load and providing yaw alignment in wind turbines.

Recently, wind turbines have received increased attention as an environmentally safe and relatively inexpensive alternative energy source. With this growing interest, considerable efforts have been made to develop wind turbines that are reliable and efficient.

Generally, a wind turbine includes a rotor having multiple blades. The rotor is mounted on a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators, rotationally coupled to the rotor through a gearbox or directly coupled to the rotor. The gearbox, when present, steps up the inherently low rotational speed of the turbine rotor for the generator to efficiently convert mechanical energy to electrical energy, which is fed into a utility grid.

Horizontal wind shears and yaw misalignment, together with natural turbulence, are important causes of asymmetric loads on a wind turbine rotor. These asymmetric loads together with those from vertical wind shears contribute to extreme loads and the number of fatigue cycles accumulated by a wind turbine system. Asymmetric load control could be used to reduce these effects. However, during grid loss conditions, there is no power available for the load control systems. It has been difficult to increase rotor diameters to improve wind energy capture because the larger rotors would have to be designed to accommodate the extreme loads and fatigue cycles during times when grid power is lost and no load mitigating active control can be applied.

BRIEF DESCRIPTION OF THE INVENTION

There is therefore provided, in some configurations of the present invention, a wind turbine having a rotor, at least one rotor blade, and a plurality of generators, of which a first generator is configured to provide power to an electric grid and a second generator is configured to provide power to the wind turbine during times of grid loss. The wind turbine is configured to utilize power provided by the second generator to reduce loads on the wind turbine during times of grid loss.

Some configurations of the present invention provide a method for operating a wind turbine having a rotor, at least one rotor blade, and a plurality of generators. The method includes operating a first generator of the plurality of generators to provide power to an electric grid, operating a second generator of the plurality of generators to provide power to the wind turbine during times of grid loss, and utilizing power provided by the second generator to reduce loads on the wind turbine during times of grid loss.

Some configurations of the present invention provide a method for reducing load on a wind turbine having a rotor with at least one rotor blade. The method includes using a first generator in the wind turbine to provide electrical power to a power grid. During grid loss conditions, the method includes idling a rotor of the wind turbine, using a second generator in the wind turbine to provide electricity to a pitch control system of the wind turbine, and operating the pitch control system to reduce wind loads on the wind turbine.

Also, some configurations of the present invention provide a wind turbine having a rotor with at least one rotor blade, a first generator, and a second generator. The wind turbine is configured to use the first generator to provide electrical power to a power grid. The wind turbine is further configured, during grid loss conditions, to idle the rotor, use the second generator to provide electricity to a pitch control system, and operate the pitch control system to reduce wind loads on the wind turbine.

Configurations of the present invention provide an effective control strategy and necessary back-up power to accommodate operation during grid loss conditions when power and control would not otherwise be available. Moreover, by reducing design loads for grid loss conditions, it is possible to provide wind turbines with rotors having larger diameters and thus improved energy capture.

DETAILED DESCRIPTION OF THE INVENTION

The present invention is directed to methods and apparatus for efficiently reducing load and providing yaw alignment in wind turbines. Technical effects of the present invention include providing an effective control strategy and necessary back up power to a wind turbine during grid loss conditions and making possible wind turbines with larger rotors than and greater energy capture than is presently possible.

Figure 1:
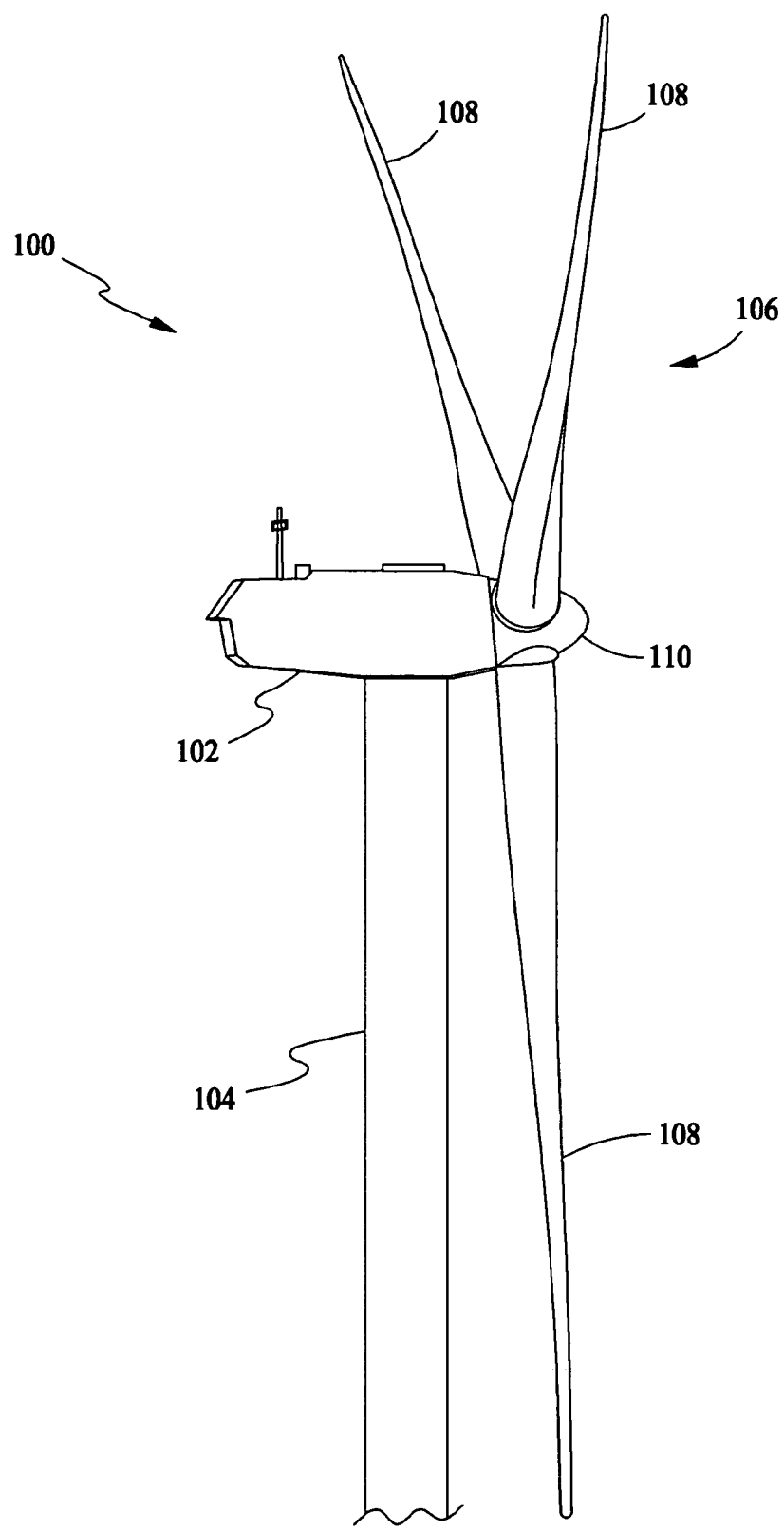
FIG. 1 is a drawing of an exemplary configuration of a wind turbine.

In some configurations and referring to FIG. 1, a wind turbine 100 in some configurations comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes a plurality of rotor blades 108 attached to a rotating hub 110. Although wind turbine 100 illustrated in FIG. 1 includes three rotor blades 108, there are no specific limits on the number of rotor blades 108 required by the present invention.

Figure 2:
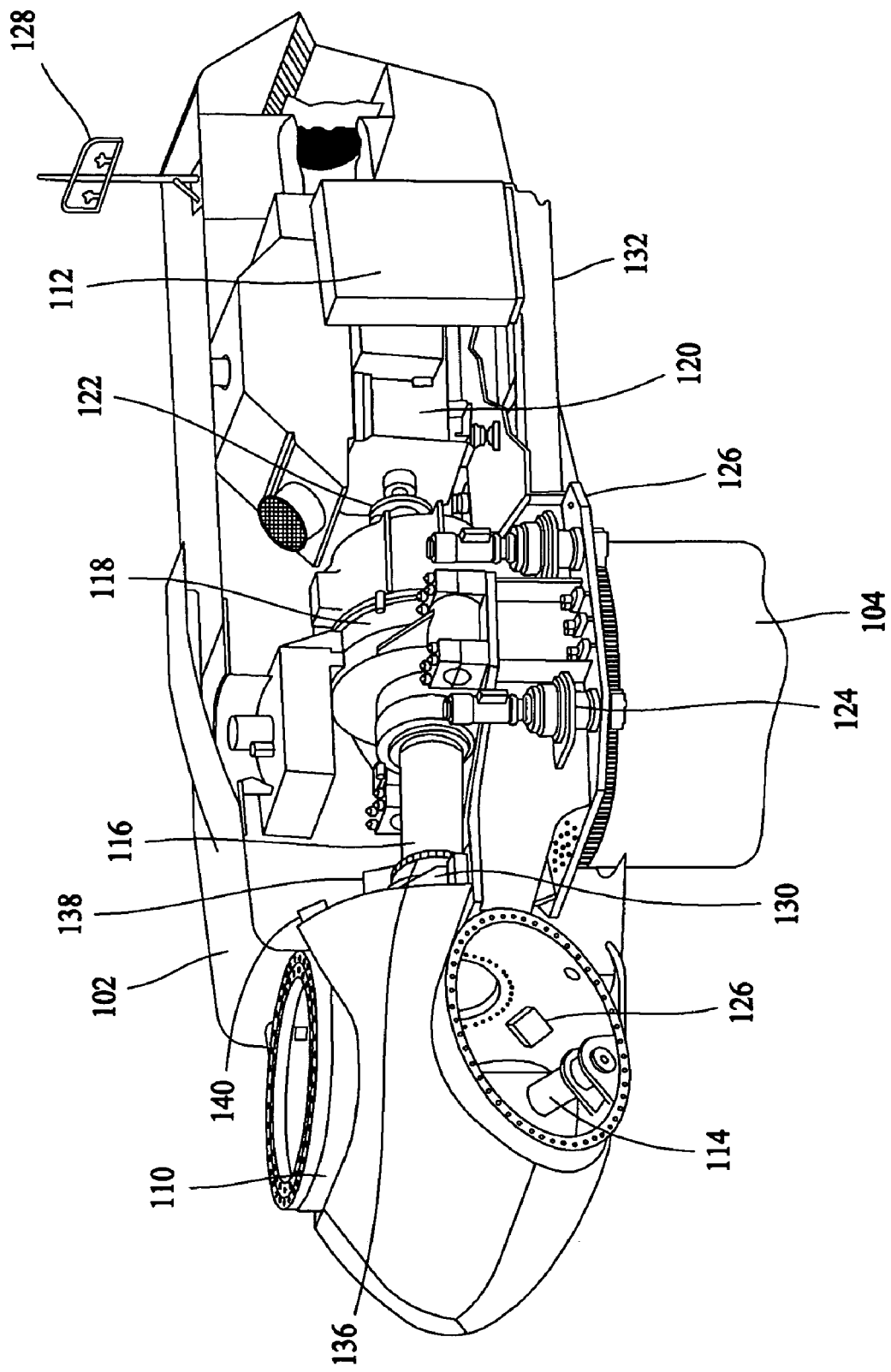
FIG. 2 is a cut-away perspective view of a nacelle of the exemplary wind turbine configuration shown in FIG. 1.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system are used for overall system monitoring and control including pitch and speed regulation, high-speed shaft and yaw brake application, yaw and pump motor application and fault monitoring. Alternative distributed or centralized control architectures are used in some configurations.

In some configurations, the control system provides control signals to a variable blade pitch drive 114 to control the pitch of blades 108 (not shown in FIG. 2) that drive hub 110 as a result of wind. In some configurations, hub 110 receives three blades 108, but other configurations can utilize any number of blades. In some configurations, the pitches of blades 108 are individually controller by blade pitch drive 114. Hub 110 and blades 108 together comprise wind turbine rotor 106.

The drive train of the wind turbine includes a main rotor shaft 116 (also referred to as a "low speed shaft") connected to hub 110 and a gear box 118 that, in some configurations, utilizes a dual path geometry to drive a high speed shaft enclosed within gear box 118. The high speed shaft (not shown in FIG. 2) is used to drive a first generator 120 that is supported by main frame 132. In some configurations, rotor torque is transmitted via coupling 122. First generator 120 may be of any suitable type, for example and without limitation, a wound rotor induction generator. Another suitable type by way of non-limiting example is a multi-pole generator that can run at the speed of the low speed shaft in a direct drive configuration, without requiring a gearbox.

Yaw drive 124 and yaw deck 126 provide a yaw orientation system for wind turbine 100. In some configurations, the yaw orientation system is electrically operated and controlled by the control system in accordance with information received from sensors used to measure shaft flange displacement, as described below. Either alternately or in addition to the flange displacement measuring sensors, some configurations utilize a wind vane 128 to provide information for the yaw orientation system. The yaw system is mounted on a flange provided atop tower 104.

Figure 3:
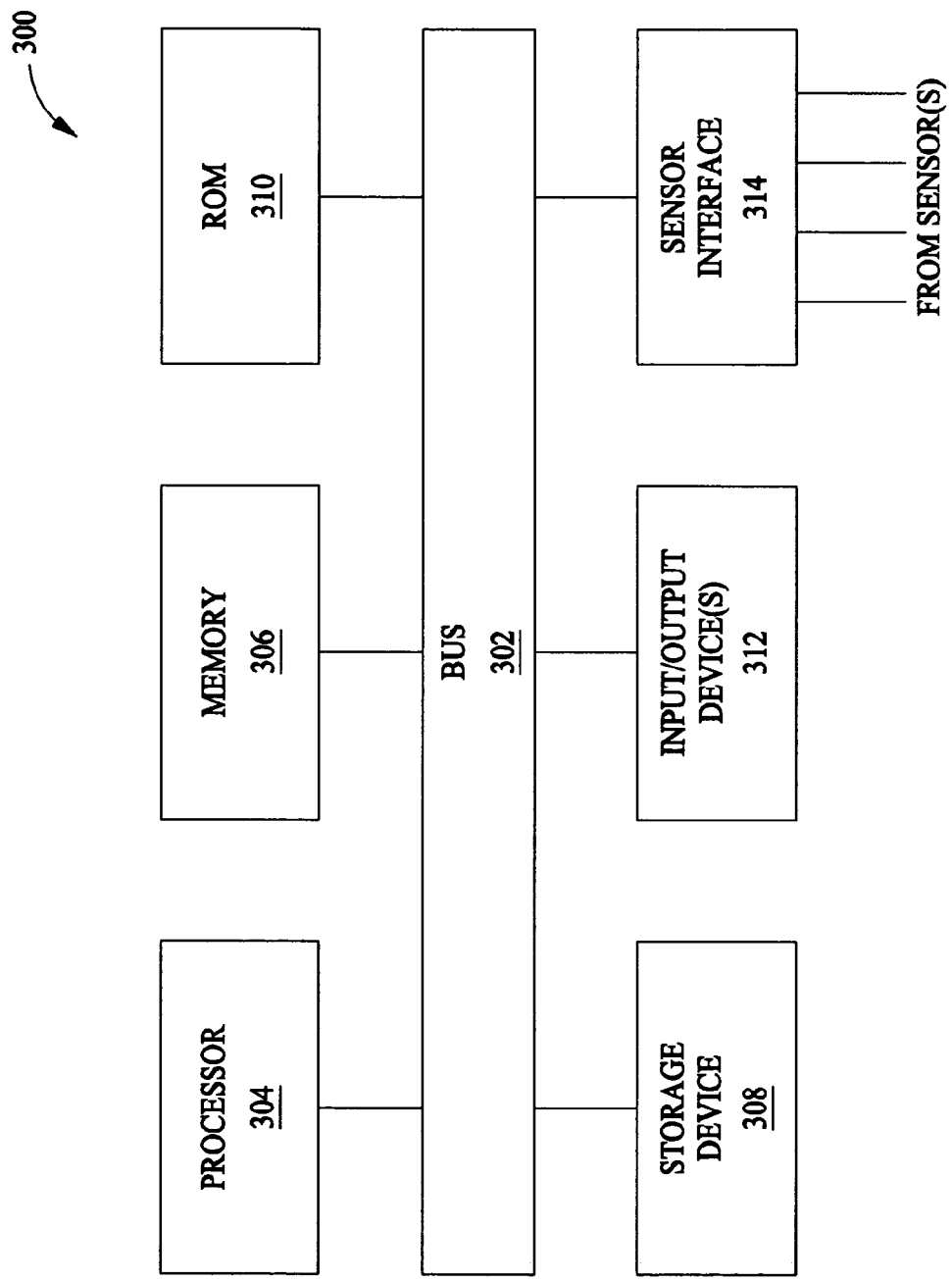
FIG. 3 is a block diagram of an exemplary configuration of a control system for the wind turbine configuration shown in FIG. 1.

In some configurations and referring to FIG. 3, a control system 300 for wind turbine 100 includes a bus 302 or other communications device to communicate information. Processor(s) 304 are coupled to bus 302 to process information, including information from sensors configured to measure displacements or moments. Control system 300 further includes random access memory (RAM) 306 and/or other storage device(s) 308. RAM 306 and storage device(s) 308 are coupled to bus 302 to store and transfer information and instructions to be executed by processor(s) 304. RAM 306 (and also storage device(s) 308, if required) can also be used to store temporary variables or other intermediate information during execution of instructions by processor(s) 304. Control system 300 can also include read only memory (ROM) and or other static storage device 310, which is coupled to bus 302 to store and provide static (i.e., non-changing) information and instructions to processor(s) 304. Input/output device(s) 312 can include any device known in the art to provide input data to control system 300 and to provide yaw control and pitch control outputs. Instructions are provided to memory from a storage device, such as magnetic disk, a read-only memory (ROM) integrated circuit, CD-ROM, DVD, via a remote connection that is either wired or wireless providing access to one or more electronically-accessible media, etc. In some embodiments, hard-wired circuitry can be used in place of or in combination with software instructions. Thus, execution of sequences of instructions is not limited to any specific combination of hardware circuitry and software instructions. Sensor interface 314 is an interface that allows control system 300 to communicate with one or more sensors. Sensor interface 314 can be or can comprise, for example, one or more analog-to-digital converters that convert analog signals into digital signals that can be used by processor(s) 304.

Figure 4:
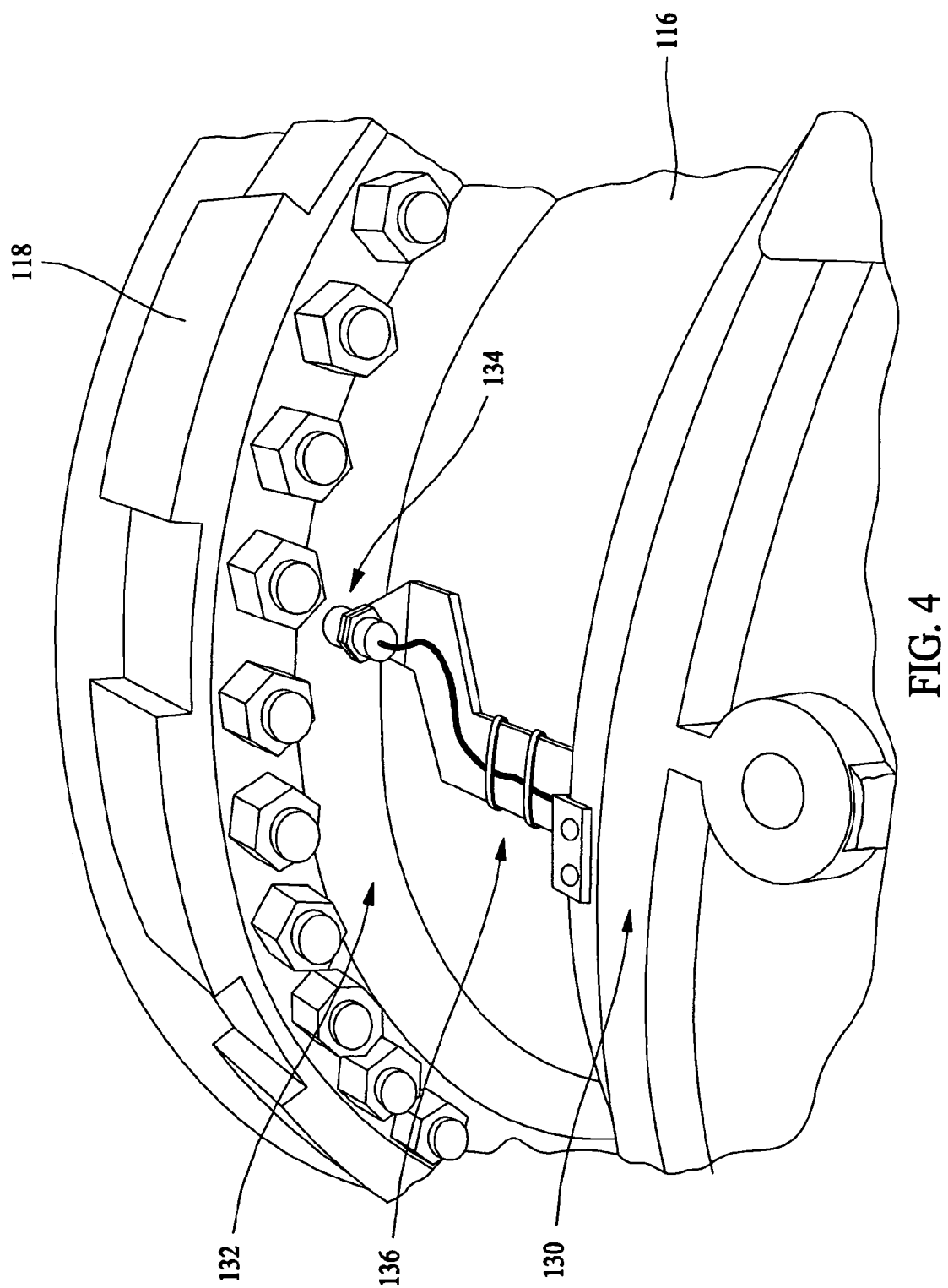
FIG. 4 is a perspective view of a portion of the main rotor shaft and a sensor used in some configurations of the present invention.

Asymmetric loads acting on wind turbine rotor blades 108 translate into moments acting on hub 110 and subsequently low speed shaft 116. Referring to FIG. 4, these moments are manifested as deflections or strains at main shaft flange 132. Sensors 134 (shown in FIG. 4 but not in FIG. 3), such as proximity sensors, are utilized to measure main shaft flange 132 displacement. In some configurations, each sensor 134 is mounted on a sensor bracket 136 that is attached to main bearing 130. Sensor readings from sensors 134 indicating measured displacements or moments are used by the control system to determine a pitch command for each rotor blade 108 to reduce asymmetric rotor loading and a favorable yaw orientation to reduce pitch activity. In some configurations, at least three sensors 104 are used to measure displacements of main shaft flange 132 of wind turbine 100 resulting from asymmetric loads. Also in some configurations, sensors 134 are proximity sensors that measure main shaft flange 132 displacement relative to a non-deflecting reference frame, for example, main bearing 130. Some configurations utilize four sensors with 90 degree spacing to measure displacements of shaft flange 132. Blade root bending moment sensors (not shown) can also be used to detect and measure asymmetric loads, particularly during times when grid power is available, but are not required in all configurations of the present invention due to the stochastic nature of the extreme events that are addressed herein.

A feedback control system is used in some configurations of the present invention to reduce asymmetric loads from acting on rotor 106, shaft 116, and being translated to other turbine components. Cyclic pitching of blades 108 is used to reduce the effects of shears and turbulence. Asymmetric loading occurs as a result of vertical and horizontal wind shears, yaw misalignment, and turbulence. This loading translates into moments of hub 110 and low speed shaft 116. These moments manifest themselves as deflections or strains at the shaft 116 and moments acting at various locations across the wind turbine system.

In some configurations of the present invention, measurement of shaft 116 displacement or moments at other turbine locations caused by asymmetric loads are used as an indication of the magnitude of asymmetric loading. Signals representing these measurements are provided to sensor interface 314 and used by processor(s) 304 to determine a pitch command for each rotor blade 108 that is carried out utilizing pitch drive 114 and a favorable yaw orientation. Yaw drive 124 and yaw deck 126 are used in some configurations to adjust yaw alignment of the wind turbine in accordance with the favorable yaw orientation using any suitable known classical or modern control technique known in the art so as to reduce asymmetric loads. In some configurations, yaw regulation is implemented (for example, as software instructions stored in ROM 310 and executed by processor(s) 304) as a secondary control loop that acts to remove the effects of horizontal wind shear and any yaw misalignment that may be inducing asymmetric loads on rotor 106.

The pitch system includes pitch drives 114. Coordinate transformation, bias estimation methods, and/or other control techniques known in the art can be used in various configurations by control system 300 to determine a pitch increment for each rotor blade 108 to reduce overall asymmetric rotor loading.

In some configurations of the present invention and referring again to FIGS. 1 and 2, rotor 106 is permitted to idle during grid loss episodes. A small second generator 138 and/or 140 (both need not be present) provides a source of back-up electricity sufficient to run the pitch system and associated control systems, which can include control system 300 in some configurations. (A second generator can also, in some configurations, provide useful energy to a storage system that can be used to supplement energy production or system demands during period of normal operation.) A secondary controller 142 in hub 110 is provided in addition to control system 300 in some configurations to command cyclic blade control utilizing a classical or modern control technique during times of grid loss. Control system 300 and/or secondary controller 142 are configured to sense grid loss conditions and at such times, operate using power generated by second generator 138 and/or 140. Secondary controller 142 can be a slave controller receiving commands from control system 300 or it can be an independent controller. Classical and modern control techniques that can be utilized to command cyclic blade control are known in the art and do not need to be described further herein.

Some configurations of the present invention utilize a bull gear 136 fixed to main bearing 130 that drives second generator 138 attached to hub 110. In other configurations, an axial flux generator 140 that serves as the second generator is fitted between hub 110 and nacelle 102. Still other configurations use a combination of generators of the same or different types. In some configurations, pitch control provided by secondary controller during times of grid loss is combined with a yaw brake release control system to allow rotor 106 to align with a prevailing wind direction and/or reduce loads during yaw errors by cyclic pitching. The yaw brake control system can be a software module contained in a memory of control system 300, wherein a yaw brake within yaw drive 124 is released during times of grid power loss. The resultant reduction in design driving loads allows configurations of wind turbines 100 having increased rotor 106 diameter and improved energy capture.

Thus, in some configurations, a method is provided for reducing load on a wind turbine 100 having a rotor 106 with at least one rotor blade 108. At least two generators are used, wherein at least a first generator is configured to provide power to an electrical grid and at least a second generator is configured to provide power to the wind turbine. Wind turbine 100 is configured to use power provided by the second generator to reduce loads on wind turbine 100 during the times of grid loss. A first generator 120 in wind turbine 100 is used to provide electrical power to a power grid. During grid loss conditions, rotor 106 is allowed to idle and a second generator 138 and/or 140 in wind turbine 100 is used to provide electricity to a pitch control system (comprising, for example, pitch drive or drives 114) of wind turbine 100. The pitch control system is operated to reduce wind loads on the wind turbine during times of grid loss. In some configurations, second generator 138 is attached to hub 110 of wind turbine 100. A bull gear 136 fixed to main bearing 130 of wind turbine 100 drives second generator 138 in some configurations. In some configurations an axial flux generator 140 is utilized as a second generator. Axial flux generator 140 may be fitted between hub 110 and nacelle 102 of wind turbine 100. In some configurations, the pitch control system, including pitch drive or drives 114, is operated utilizing a slave or secondary controller 142 to command a cyclic blade control. Slave or secondary controller 142 can be located in hub 110 of wind turbine 100.

Some configurations of wind turbine 100 utilize second generator 138 and/or 140 (i.e., either 138 or 140, if only it is present, or either or both in combination if both are present) to operate a yaw brake release (e.g., within yaw drive 124) during grid loss conditions. The release of the yaw brake is used in some configurations to align rotor 106 of wind turbine 100 with a prevailing wind direction during grid loss conditions to reduce loading. The pitch control system can also be operated in conjunction with the yaw brake release to command a cyclic blade control.

It will thus be appreciated that configurations of the present invention provide an effective control strategy and necessary back-up power to accommodate operation during grid loss conditions when power and control would not otherwise be available. Moreover, by reducing design loads for grid loss conditions, it is possible to provide wind turbines with rotors having larger diameters and thus improved energy capture.

While the invention has been described in terms of various specific embodiments, those skilled in the art will recognize that the invention can be practiced with modification within the spirit and scope of the claims.

What is claimed is:

1. A method for reducing load on a wind turbine having a rotor with at least one rotor blade, said method comprising:
    using a first generator in the wind turbine to provide electrical power to a power grid;
and said method further comprising, during grid loss conditions:
    idling a rotor of the wind turbine;
    using a second generator in the wind turbine to provide electricity to a pitch control system of the wind turbine; and
    operating the pitch control system to reduce wind loads on the wind turbine.

2. A method in accordance with claim 1 wherein the second generator is attached to a hub of the wind turbine.

3. A method in accordance with claim 2 wherein said using a second generator in the wind turbine comprises driving the second generator using a bull gear fixed to a main bearing of the wind turbine.

4. A method in accordance with claim 1 wherein the second generator is an axial flux generator.

5. A method in accordance with claim 4 wherein the axial flux generator is fitted between a hub of the wind turbine and a nacelle of the wind turbine.

6. A method in accordance with claim 1 wherein said operating the pitch control system to reduce wind loads on the wind turbine further comprises utilizing a slave controller to command a cyclic blade control.

7. A method in accordance with claim 6 wherein the slave controller is located in a hub of the wind turbine.

8. A method in accordance with claim 1 further comprising using the second generator to generate electricity to operate a yaw brake release during grid loss conditions.

9. A method in accordance with claim 8 further comprising aligning the rotor of the wind turbine with a prevailing wind direction during grid loss conditions.

10. A method in accordance with claim 9 wherein said operating the pitch control system to reduce wind loads on the wind turbine further comprises utilizing a slave controller to command a cyclic blade control.

11. A method in accordance with claim 10 wherein the slave controller is in a hub of the wind turbine.

12. A wind turbine comprising a rotor with at least one rotor blade, a first generator, and a second generator, said wind turbine configured to:

use said first generator to provide electrical power to a power grid;

and said wind turbine further configured, during grid loss conditions, to:

idle said rotor;

use said second generator to provide electricity to a pitch control system; and operate the pitch control system to reduce wind loads on the wind turbine.

13. A wind turbine in accordance with claim 12 wherein the second generator is attached to a hub of the wind turbine.

14. A wind turbine in accordance with claim 13 further comprising a bull gear fixed to a main bearing of the wind turbine and configured to drive said second generator.

15. A wind turbine in accordance with claim 12 wherein the second generator is an axial flux generator.

16. A wind turbine in accordance with claim 15 wherein said axial flux generator is fitted between a hub of the wind turbine and a nacelle of the wind turbine.

17. A wind turbine in accordance with claim 12 wherein to operate the pitch control system to reduce wind loads on the wind turbine, said wind turbine further comprises a slave controller configured to command a cyclic blade control.

18. A wind turbine in accordance with claim 17 wherein said slave controller is located in a hub of the wind turbine.

19. A wind turbine in accordance with claim 12 further configured to use the second generator to generate electricity to operate a yaw break release during grid loss conditions.

20. A wind turbine in accordance with claim 19 further configured to aligning the rotor of the wind turbine with a prevailing wind direction during grid loss conditions.

21. A wind turbine in accordance with claim 20 wherein to operate said pitch control system to reduce wind loads on the wind turbine, said wind turbine further comprises a slave controller configured to command a cyclic blade control.

22. A wind turbine in accordance with claim 21 wherein said slave controller is in a hub of the wind turbine.

23. A wind turbine comprising a rotor, at least one rotor blade, and a plurality of generators, wherein at least a first generator of said plurality of generators is configured to provide power to an electric grid and at least a second generator of said plurality of generators is configured to provide power to the wind turbine during times of grid loss, and wherein said wind turbine is configured to utilize power provided by said second generator to reduce loads on said wind turbine during times of grid loss.

24. A wind turbine in accordance with claim 23 wherein said power provided by said second generator is used to control pitch of said at least one rotor blade during times of grid loss.

25. A wind turbine in accordance with claim 24 wherein said power provided by said second generator is used to operate a yaw brake release during times of grid loss.

26. A method for operating a wind turbine having a rotor, at least one rotor blade, and a plurality of generators, said method comprising operating a first generator of said plurality of generators to provide power to an electric grid; operating a second generator of said plurality of generators to provide power to the wind turbine during times of grid loss, and utilizing power provided by said second generator to reduce loads on said wind turbine during times of grid loss.

* * * * *